United States Patent [19]

Vosberg

[11] Patent Number: 4,740,256
[45] Date of Patent: Apr. 26, 1988

[54] METHOD OF MAKING A WEATHER STRIP

[75] Inventor: Daryl E. Vosberg, Cottage Grove, Minn.

[73] Assignee: Minnesota Mining and Manufacturing Company, Saint Paul, Minn.

[21] Appl. No.: 896,675

[22] Filed: Aug. 14, 1986

[51] Int. Cl.⁴ .................. B32B 31/08; B32B 31/16; B32B 31/18

[52] U.S. Cl. .................. 156/73.1; 156/200; 156/271; 156/289; 156/324; 156/462; 156/553; 156/555; 156/580.2; 156/582; 264/23; 264/263; 264/DIG. 77

[58] Field of Search .............. 156/73.1, 73.4, 271, 156/580.1, 580.2, 200, 209, 210, 219, 220, 292, 583.5, 553, 555, 462, 253, 581, 582, 537, 78, 324, 289; 264/23, 263, 266, 321, DIG. 57, DIG. 77

[56] References Cited

U.S. PATENT DOCUMENTS

| | | | |
|---|---|---|---|
| 2,793,676 | 5/1957 | Hubmeier | 156/462 |
| 2,913,773 | 11/1959 | Hassel | 156/324 |
| 3,320,103 | 5/1967 | Lande | 156/219 |
| 3,620,872 | 11/1971 | Backwell | 156/289 |
| 3,634,565 | 1/1972 | Schaerer | 264/54 |
| 3,666,587 | 5/1972 | Nagao | 156/219 |
| 3,881,980 | 5/1975 | Olson | 156/268 |
| 4,064,654 | 12/1977 | Olson | 264/321 |
| 4,393,116 | 7/1983 | Taylor | 156/220 |
| 4,410,383 | 10/1983 | Lipari | 156/73.1 |
| 4,449,962 | 5/1984 | Copia | 156/583.1 |

Primary Examiner—Jerome Massie
Assistant Examiner—Lori Cuervo
Attorney, Agent, or Firm—Donald M. Sell; james A. Smith; William L. Huebsch

[57] ABSTRACT

A method for making weather strips in which a polyurethane film is positioned along an anvil having longitudinal parallel spaced anvil surfaces and recesses therebetween with elongate channel-like portions of the film in the recesses. Resiliently compressible polyurethane foam is pressed against the polyurethane film along the anvil so that the foam is compressed against the anvil surfaces and extends into the channel-like portions of the film in the recesses. The compressed foam and film along the spaced anvil surfaces are then sonically welded to fuse the foam together in its compressed state and fuse the compressed foam to the film, and the fused foam and film are slit along the anvil surfaces to form separate weather strips.

11 Claims, 3 Drawing Sheets

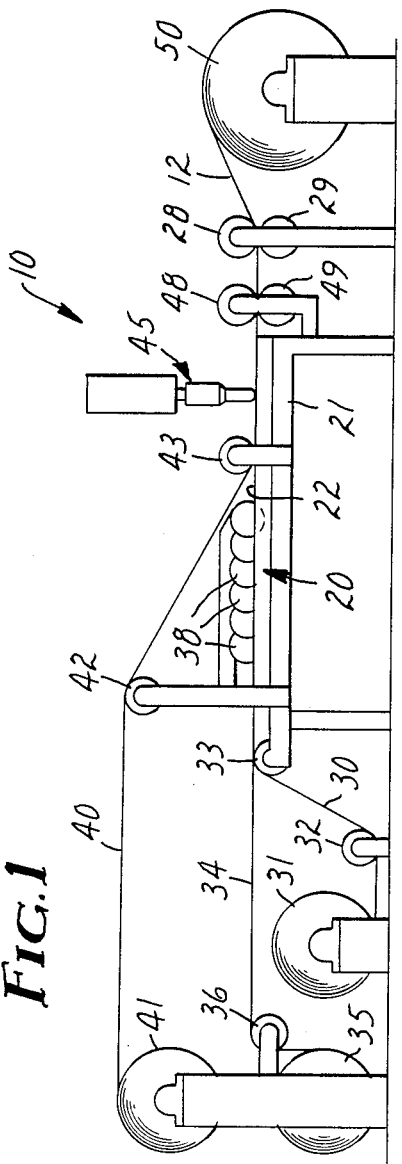
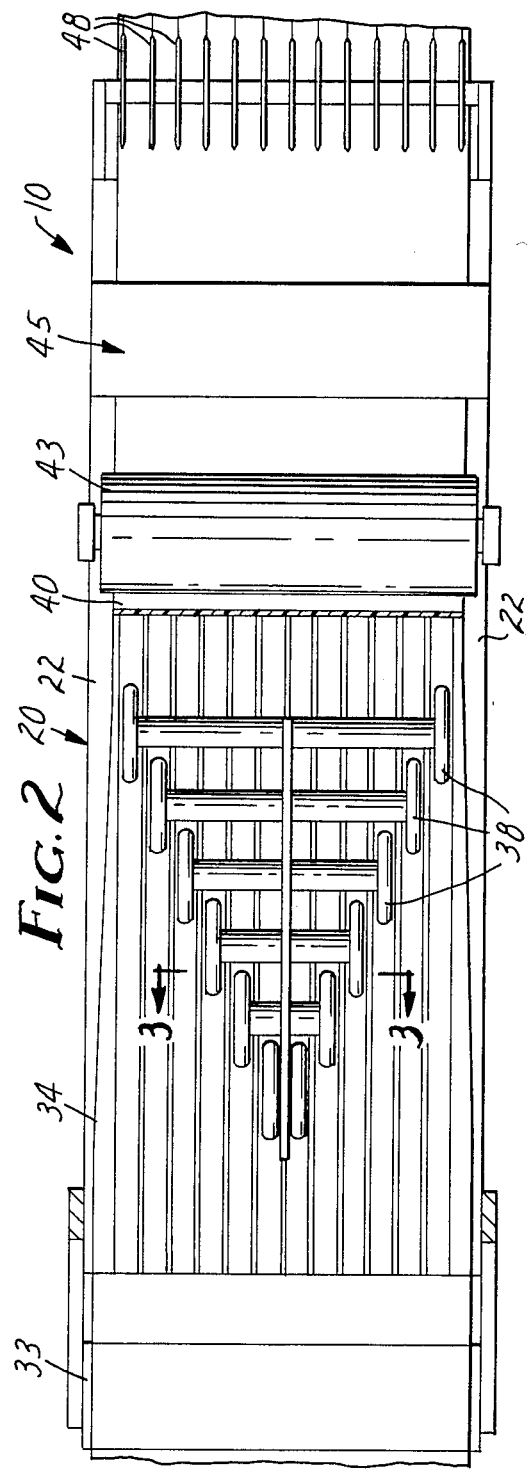
FIG. 1
FIG. 2

METHOD OF MAKING A WEATHER STRIP

TECHNICAL FIELD

The present invention relates to methods for making elongate weather strips of predetermined cross sectional shapes having resiliently compressible cores and tough abrasion resistant outer layers defining at least portions of their peripheries.

BACKGROUND ART

Methods are known for making elongate weather strips of predetermined cross sectional shapes having resiliently compressible cores and tough abrasion resistant outer layers defining at least portions of their peripheries.

One such method is described in U.S. Pat. No. 3,881,980 wherein foam is shaped by heated rollers into longitudinal strips of predetermined cross sectional shapes, and those strips are then partially coated with materials that then provide tough abrasion resistant outer layers for the weather strips.

Another method is described in U.S. Pat. No. 3,634,565 wherein weather strips of predetermined cross sectional shapes are made by injecting foam into elongate channels lined with films that then provide tough outer layers for the weather strips.

While either method can probably produce weather strips that are suitable for many purposes, neither method is as simple or inexpensive as may be desired for producing such weather strips having simple cross sectional shapes.

DISCLOSURE OF THE INVENTION

The present invention provides a simple effective and inexpensive method for making elongate weather strips with resiliently compressible cores and tough abrasion resistant layers defining at least portions of their peripheries.

The method according to the present invention for making weather strips comprises the steps of (1) providing an anvil having elongate parallel spaced anvil surfaces with recesses therebetween; (2) positioning a polymeric film (e.g., polyurethane film) along the anvil with elongate channel-like portions of the film in the recesses; (3) pressing resiliently compressible polymeric foam (e.g., polyurethane foam) against the film along the anvil so that the foam is compressed against the anvil surfaces and extends into the channel-like portions of the film in the recesses; (4) sonically welding the compressed foam and film along the spaced anvil surfaces to fuse the foam together in its compressed state and fuse the compressed foam to the film; and (5) slitting the fused foam and film along the anvil surfaces to form separate weather strips.

This method can be performed using a fixed anvil by moving the film and the foam along the anvil in a direction parallel to the anvil surfaces during the positioning, pressing, sonic welding and slitting steps, in which case if polyurethane film (which does not have slippery surfaces) is being incorporated in the weather strip, preferably a polyester film is positioned between the polyurethane film and the anvil to provide a slippery surface facilitating movement of the polyurethane film and foam along the anvil. Also, when the film to be incorporated in the weather strip is moved relative to the anvil, the channel-like portions of that film are preferably positioned in the channels by first pressing the film into central channels along the anvil and then progressively pressing the film into adjacent channels at positions progressively spaced longitudinally of the channels in the direction toward which polyurethane film is moved along the anvil.

Alternatively the method can be performed by moving the anvil, foam and film to be incorporated in the weather strip in synchronism during the pressing, sonic welding and slitting steps, which can conveniently be done by making the anvil cylindrical with the anvil surfaces and recesses extending circumferentially around its periphery, and moving the anvil, foam and film by rotating the anvil about its axis. With such a moving anvil the film can be positioned along the anvil with the channel-like portions of the film in the channels by the use of a heater to soften the film and a vacuum system to reduce the air pressure along the channels so that atmospheric pressure will stretch and press the softened film into the channels.

BRIEF DESCRIPTION OF THE DRAWING

The present invention will be further described with reference to the accompanying drawing wherein like numbers refer to like parts in the several views, and wherein:

FIG. 1 is a schematic side view of a first type of device for making weather strips using the method according to the present invention;

FIG. 2 is an enlarged fragmentary plan view of the device shown in FIG. 1;

DETAILED DESCRIPTION

Figure 3:
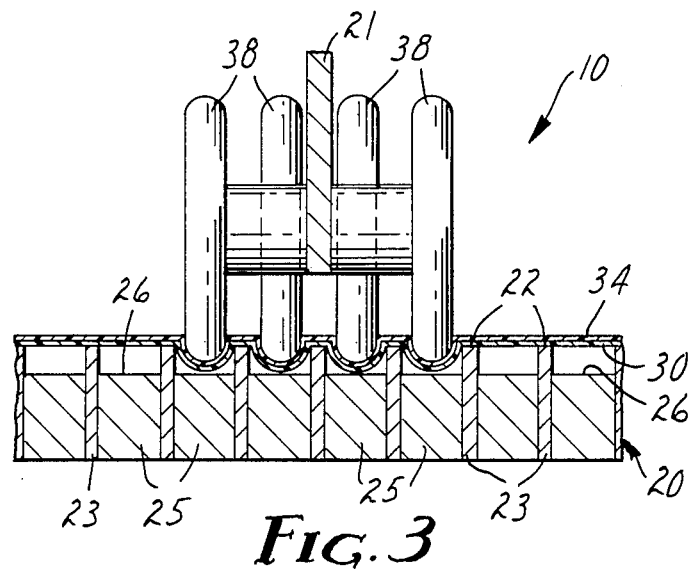
FIG. 3 is an enlarged fragmentary sectional view taken approximately along line 3—3 of FIG. 2.
Figure 4:
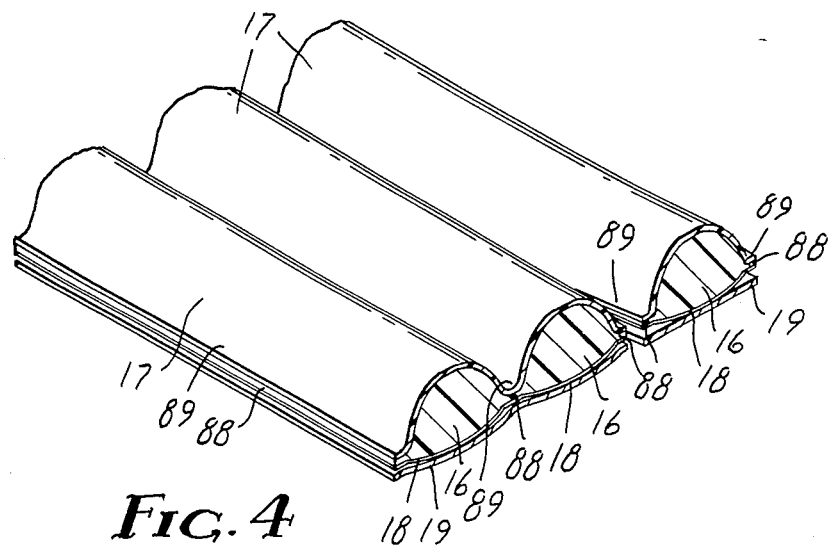
FIG. 4 is an enlarged perspective sectional view of weather strips made by the device of FIG. 1.

Referring now to FIGS. 1 through 3 there is shown a first type of device 10 for making elongate weather strip 12 of the type shown in FIG. 4, which weather strip 12 has an elongate generally semicylindrical core or central portion 16 of resiliently compressible foam, a tough abrasion resistant generally semicylindrical elongate piece of polymeric film 17 around about one half of the periphery of the central portion 16 which defines a portion of the periphery of the weather strip, and a layer of pressure sensitive adhesive 18 covered by a release liner 19 along about one-half of the periphery of the central portion 16 opposite the film 17 by which layer of adhesive 18 the weather strip 12 may be adhered to a substrate.

As is seen in FIGS. 1 through 3, the device 10 includes an anvil 20 fixed on a frame 21 of the device 10 and having longitudinally extending parallel spaced planar anvil surfaces 22 lying in a common plane and defined by the upper surfaces of rectangular anvil bars 23. The anvil 20 also includes longitudinally extending recesses 26 between and parallel to the anvil surfaces 22 defined by adjacent side surfaces of the anvil bars 23 and the recessed upper surfaces of spacer bars 25 that space apart the anvil bars 23. The anvil and spacer bars 23 and 25 are preferably independently adjustably supported on the frame 21 by screws (not shown) that afford proper alignment of the anvil surfaces 22 and a desired depth for the recesses 26.

Three sheet materials are pulled through the device 10 along the anvil surfaces 22 by driving engagement from a pair of nipping rollers 28 and 29. Those sheet materials include a polyester film 30 from a supply roll 31 (e.g., 0.003 centimeter (0.001 inch) thick), which film 30 is guided along guide rollers 32 and 33 to a position along and contacting the anvil surfaces 22 to provide a slippery surface adjacent the anvil 20 that affords pulling the sheet materials therealong. In the device 10 as illustrated this polyester film 30 is rolled with the finished weather strip 12 and discarded when the weather strip 12 is used. Alternatively the polyester film 30 could be made into a continuous loop or belt that is separated from the other sheet materials prior to a slitting step (explained later) and is driven in a continuous generally oval path partially defined by the anvil surfaces 22.

The three sheet materials also include a polyurethane film 34 from a supply roll 35 (e.g., 0.005 centimeter (0.002 inch) thick polyurethane film commercially available from Deerfield Urethane Inc., South Deerfield, Mass. 01373) which is guided by a guide roller 36 and the guide roller 33 to a position against the polyester film 30 along the anvil surface 22 on the side of the polyester film 30 opposite the anvil 20. As is best seen in FIGS. 2 and 3, elongate generally semicylindrical channel-like portions of both the polyurethane film 34 and the polyester film 30 are positioned in the recesses 26 of the anvil 20 by a plurality of wheels 38 rotatable on axes transverse to the recesses 26 and having arcuate peripheral surfaces, portions of which peripheral surfaces extend into the recesses 26. The wheels 38 are positioned in generally a V-shaped pattern (FIG. 2) pointed opposite the direction of movement of the films 30 and 34 along the anvil 20 with two wheels 38 on the same axis first encountered by the films 30 and 34 moving along the anvil surfaces 22 being positioned at the central recesses 26 of the anvil 20 and the wheels 38 that subsequently are encountered by the films 30 and 34 moving along the anvil surfaces 22 being progressively at adjacent recesses 26 and spaced along the anvil 20 in the direction toward which the films 30 and 34 are moved. Thus, the wheels 38 first press central channel-like portions of the films 30 and 34 into the centermost recesses 26 along the anvil 20 and then progressively press channel-like portions of the films 30 and 34 into the adjacent recesses 26 so that the films 30 and 34 are laterally gathered to provide film material to form the channel-like portions of the films 30 and 34 pressed into the recesses 26.

The third sheet material is a resiliently compressible polyurethane foam 40 from a supply roll 41 (e.g., 0.79 centimeter (5/16 inch) thick, 4100 series open cell polyurethane foam commercially available from General Foam Corporation, Paramus, N.J. 07652) having a layer of pressure sensitive adhesive covered by a release liner along one surface (e.g., the No. 950 transfer adhesive or the No. 444 transfer tape available from the Industrial Specialties Division, Minnesota Mining and Manufacturing Company, St. Paul, Minn. covered by a silicon paper release liner). The foam 40 extends over a guide roll 42 and under a cylindrical pressure roller 43 with the adhesive and release liner adjacent the pressure roller 43. The pressure roller 43 presses the polyurethane foam 40 against the polyurethane film 34 moving along the anvil 20 so that the foam 40 is compressed against the anvil surfaces 22 and extends into the generally semicylindrical channel-like portions of the polyurethane film 34 in the recesses 26. The compressed condition of the portions of the polyurethane foam 40 and polyurethane film 34 along the spaced planar anvil surfaces 22 is maintained by shoes on sonic welding horns 45 (which horns 45 are typically closer to the pressure roller 43 than illustrated) and those compressed portions are sonically welded by the sonic welding horns 45 (e.g., the Model 8400 ultrasonic plastics assembly system available from Bronson Sonic Power Company, Eagle Road, Danbury, Conn. 06810) to fuse the foam 40 together in its compressed state and fuse the compressed foam 40 to the polyurethane film 34 (but not the polyurethane film 34 to the polyester film 30).

The fused polyurethane foam 40 and polyurethane film 34, the adhesive layer and release liner on the foam 40 and the polyester film 30 are then slit by circular slitting knives 48 pressed against an anvil roller 49. Alternatively, such slitting could be done by razor blades, or wheels at the ends of the shoes on the sonic welding horns 45 opposite the pressure roller 43 and on the side of the foam 40 and film 34 opposite the horns 45 that provide sonic slitting in a known manner. The slit lengths of weather strip 12 together with the slit polyester film 30 are pulled through the nipping drive rollers 28 and 29 and are wound in coils on a wind up device 50.

Figure 5:
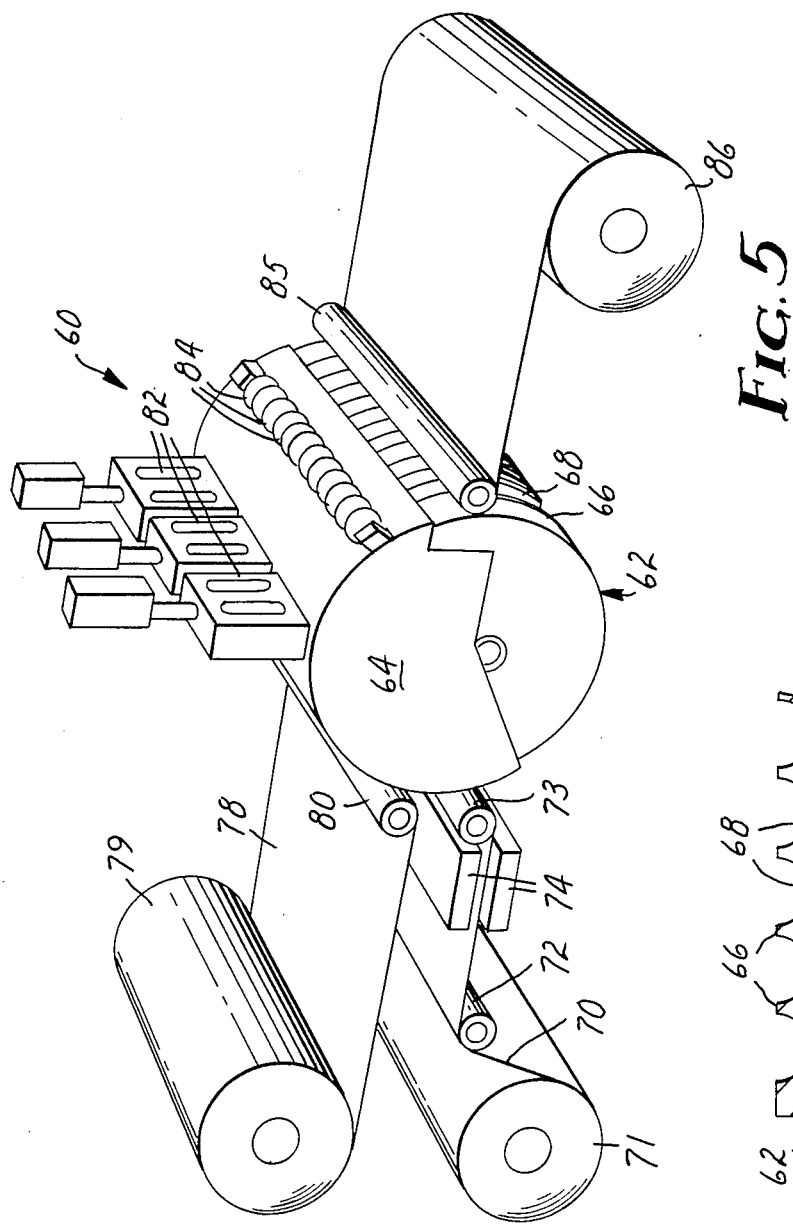
FIG. 5 is a perspective schematic view of a second alternate type of device for making weather strip using the method according to the present invention.
Figure 6:
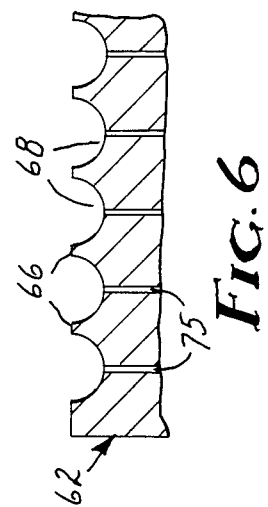
FIG. 6 is an enlarged fragmentary sectional view of a cylindrical anvil shown in FIG. 5.

Referring now to FIGS. 5 and 6 there is shown a second type of device 60 for making the weather strip 12 shown in FIG. 4. The device 60 includes a cylindrical anvil 62 rotatably mounted on a frame 64 of the device 60 and having elongate concentric parallel spaced cylindrical anvil surfaces 66 extending circumferentially around the anvil 62. The anvil 62 also includes elongate concentric circumferentially extending concave recesses 68 between and parallel to the anvil surfaces 66.

Two sheet materials are pulled through the device 60 and move in synchronism with the anvil surfaces 66 by the use of a drive means (not shown) which rotates the anvil 62.

The two sheet materials include a polyurethane film 70 from a supply roll 71 which is guided by guide rollers 72 and 73 between infrared heaters 74 that soften the film 70 onto the anvil surfaces 66 where air pressure in the recesses 68 is reduced by a vacuum system (not shown) through ports 75 so that the air pressure stretches and presses the softened polyurethane film 70 into the recesses 68 of the anvil 62.

The second sheet material is a resiliently compressible polyurethane foam 78 from a supply roll 79 having a layer of pressure sensitive adhesive covered by a release liner along one surface. The foam 78 extends under a cylindrical pressure roller 80 with the release liner adjacent the pressure roller 80 which presses the polyurethane foam 40 against the polyurethane film 70 moving with the anvil 62 so that the foam 78 is compressed against the anvil surfaces 66 and extends into channel-like portions of the polyurethane film 70 in the recesses 68. The compressed polyurethane foam 78 and polyurethane film 70 along the spaced planar anvil surfaces 66 are then sonically welded by sonic welding horns 82 to fuse the foam 78 together in its compressed state and fuse the compressed polyurethane foam 78 to the polyurethane film 70.

The fused polyurethane foam 78 and polyurethane film 70, the layer of adhesive and the release liner are then slit by circular slitting knives 84 pressed against the anvil surfaces 66 and the slit lengths of weather strip 12 move off of the anvil 62 around a guide roller 85 and to wind up device 86 where they are wound into coils.

Thus either of the devices 10 or 60 provide the weather strip 12 in which compressed opposite side edge portions 88 of the generally semicylindrical foam core 16 are internally fused to retain them in their compressed condition and edge portions 89 of the semicylindrical film layer 17 are fused to the compressed edge portions 88 of the foam core 16.

Two embodiments of the the method and one embodiment of the weather strip according to the present invention have now been described. It will be apparent to those skilled in the art that many changes can be made in the embodiments described without departing from the scope of the present invention. For example, the laminate of the film and foam layers 34 and 40 or 70 and 78 formed on the devices 10 and 60 respectively can be formed before they are fed onto the anvil 20 or 62 which, for the device 10, means that the wheels 38 will not be used and for both devices 10 and 60 typically means that the laminate will not project into the recesses 26 or 68 as far as does the separate film 34 or 70 and foam 40 or 78 fed as described above. This may not be objectionable, particularly where wide relatively thin weather strips or similar objects are desired. Also, that lamainte may be provided by a layer of foam that has been melted or coated along one surface to provide an abrasion resistant layer, and can also be used to form weather strips or similar objects on the devices 10 and 60 by positioning the abrasion resistant coating adjacent the anvil 20 or 62 and performing the pressing, sonic welding and slitting steps described above. Thus the scope of the present invention should not be limited to the methods and structures described in this application, but only by the methods and structures described by the language of the claims and the equivalents of those methods and structures.

I claim:

1. A method for making weather strips comprising the steps of:
   (a) providing an anvil having elongate parallel spaced anvil surfaces and having elongate recesses between the anvil surfaces;
   (b) positioning a polymeric film along the anvil with elongate channel-like portions of the film in the recesses;
   (c) pressing resiliently compressible foam against the film along the anvil so that the foam is compressed against the anvil surfaces and extends into the channel-like portions of the film in the recesses;
   (d) sonically welding the compressed foam and film along the spaced anvil surfaces to fuse the foam together in its compressed state and fuse the compressed foam to the film;
   (e) slitting the fused foam and film along the anvil surfaces to form separate weather strips; and
   (f) moving the polymeric film and the foam along the anvil in a direction parallel to the anvil surfaces during the positioning, pressing, sonic welding and slitting steps.

2. A method according to claim 1 wherein the foam and film are of polyurethane, a polyester film is provided between the polyurethane film and the anvil, and said method includes moving the polyester film with the polyurethane film and foam to facilitate movement of the polyurethane film and the foam along the anvil.

3. A method according to claim 2 wherein said step of positioning the film along the anvil with channel-like portions of the film in the recesses includes the step of pressing the polymeric film into the recesses progressively transversely from the central recesses wherein said transversely pressing step also occurs at positions longitudinally from the previously pressed recesses in the direction in which the film is moved along the anvil.

4. A method for making weather strips comprising the steps of:
   (a) providing an anvil having elongate parallel spaced anvil surfaces and having elongate recesses between the anvil surfaces;
   (b) positioning a polymeric film along the anvil with elongate channel-like portions of the film in the recesses;
   (c) pressing resiliently compressible foam against the film along the anvil so that the foam is compressed against the anvil surfaces and extends into the channel-like portions of the film in the recesses;
   (d) sonically welding the compressed foam and film along the spaced anvil surfaces to fuse the foam together in its compressed state and fuse the compressed foam to the film;
   (e) slitting the fused foam and film along the anvil surfaces to form separate weather strips; and
   (f) moving the anvil, foam and film in synchronism during the pressing, sonic welding and slitting steps.

5. A method according to claim 4 wherein the anvil is cylindrical and the anvil surfaces and recesses extend circumferentially around its periphery, and said moving step includes the step of rotating the anvil about its axis.

6. A method according to claim 5 wherein the step of positioning the film along the anvil with the channel-like portions of the film in the recesses includes the step of reducing the air pressure along the recesses so that atmospheric pressure will press the polymeric film into the recesses.

7. A method for making elongate weather strips or similar objects comprising the steps of:
   (a) providing an anvil having elongate parallel spaced anvil surfaces and having elongate recesses between the anvil surfaces, and a laminate comprising a layer of resiliently compressible foam having a tough abrasion resistant layer along one surface;
   (b) positioning the laminate along the anvil with the abrasion resistant layer adjacent the anvil surfaces;
   (c) pressing the laminate against the anvil so that the foam is compressed against the anvil surfaces;
   (d) sonically welding the compressed foam along the spaced anvil surfaces to fuse the foam together in its compressed state;
   (e) slitting the fused foam and the abrasion resistant layer along the anvil surfaces; and
   (f) moving the laminate along the anvil in a direction parallel to the anvil surfaces during the positioning, pressing, sonic welding and slitting steps.

8. A method according to claim 7 wherein the foam and the abrasion resistant layer are of polyurethane, a polyester film is provided between the abrasion resistant layer and the anvil, and said method includes moving the polyester film with the abrasion resistant layer and the foam to facilitate movement of the abrasion resistant layer and the foam along the anvil.

9. A method for making elongate weather strips or similar objects comprising the steps of:
   (a) providing an anvil having elongate parallel spaced anvil surfaces and having elongate recesses between the anvil surfaces, and a laminate comprising a layer of resiliently compressible foam having a tough abrasion resistant layer along one surface;
   (b) positioning the laminate along the anvil with the abrasion resistant layer adjacent the anvil surfaces;
   (c) pressing the laminate against the anvil so that the foam is compressed against the anvil surfaces;
   (d) sonically welding the compressed foam along the spaced anvil surfaces to fuse the foam together in its compressed state;
   (e) slitting the fused foam and the abrasion resistant layer along the anvil surfaces; and
   (f) moving the anvil and laminate in synchronism during the pressing, sonic welding and slitting steps.

10. A method according to claim 9 wherein the anvil is cylindrical and the anvil surfaces and recesses extend circumferentially around its periphery, and said moving step includes the step of rotating the anvil about its axis.

11. A method according to claim 10 wherein the step of positioning the laminate along the anvil includes the step of reducing the air pressure along the channels so that atmospheric pressure will press the laminate into the channels.

* * * * *